United States Patent
Crichton

(10) Patent No.: US 6,785,977 B1
(45) Date of Patent: Sep. 7, 2004

(54) MEASURING AND LEVELING DEVICE

(75) Inventor: Michael P. Crichton, 12015 Shadowbrook La., Orlando, FL (US) 32828

(73) Assignee: Michael P. Crichton, Orlando, FL (US)

(*) Notice: Subject to any disclaimer, the term of this patent is extended or adjusted under 35 U.S.C. 154(b) by 0 days.

(21) Appl. No.: 10/251,736

(22) Filed: Sep. 20, 2002

Related U.S. Application Data

(60) Provisional application No. 60/324,707, filed on Sep. 25, 2001.

(51) Int. Cl.⁷ .............................................. G01B 3/02
(52) U.S. Cl. ........................................................ 33/613
(58) Field of Search ........................ 33/613, 381, 382, 33/383, 451, 374, 528, 645

(56) References Cited

U.S. PATENT DOCUMENTS

| | | | |
|---|---|---|---|
| 2,816,366 A | | 12/1957 | Barlow |
| 3,752,566 A | | 8/1973 | Mathews |
| 4,241,510 A | * | 12/1980 | Radecki ....................... 33/613 |
| 4,429,466 A | | 2/1984 | Leonard |
| 4,590,682 A | * | 5/1986 | Koch ........................... 33/383 |
| 4,648,185 A | | 3/1987 | Brandimarte |
| 4,843,729 A | * | 7/1989 | Nagaoka et al. .............. 33/708 |
| 5,092,057 A | | 3/1992 | Hoenig, Sr. ................... 33/669 |
| 5,103,573 A | | 4/1992 | Ehling et al. ................. 33/613 |
| 5,165,650 A | * | 11/1992 | Letizia ......................... 33/379 |
| 5,566,460 A | * | 10/1996 | Bates ........................... 33/296 |
| 6,029,362 A | * | 2/2000 | Miodragovic ................ 33/666 |
| 6,393,715 B1 | * | 5/2002 | Ihle ............................. 33/669 |
| 6,421,928 B1 | * | 7/2002 | Miller .......................... 33/520 |
| 6,463,666 B1 | * | 10/2002 | Szumer ........................ 33/484 |
| 6,473,983 B1 | * | 11/2002 | Gier ............................. 33/613 |

FOREIGN PATENT DOCUMENTS

| | | | |
|---|---|---|---|
| GB | 1445271 | 8/1976 | |
| GB | 2155406 A | * 9/1985 | ............. B43L/7/00 |

OTHER PUBLICATIONS www.nationalhardwareshow.com "Mark–It!®" Model MRK24 advertisement, copyright 2001, printed Aug. 5, 2002.

* cited by examiner

*Primary Examiner*—Christopher W. Fulton
(74) *Attorney, Agent, or Firm*—Brian S. Steinberger; Law Offices of Brian S. Steinberger, P.A.

(57) ABSTRACT

Measuring and leveling device for allowing objects such as but not limited to picture frames, mirrors, and paintings, and the like, to be correctly aligned when being hung from a wall. One embodiment includes an elongated non planar shaped body having a flat rear surface for being placed against the wall and a front raised surface having calibrating indicia. The elongated bar can have at least two different measuring units placed thereon for allowing the user different readable measurements such as metric, inches, and the like. The slidable carriages have leveling gauges such as bubble gauges. The gauges can be interchangeable so that different orientated gauges(i.e. one perpendicular to the other) can be used. Alternatively the gauges can be rotatable to selected degree orientations. Each carriage can have depressible locking type switches, such as cams that allow for an on-depressed position locking the carriages to the elongated body, and an open position allowing for the carriages to be freely moveable. End caps on the elongated body restrict the carriages from sliding off. Flanges with holes on the carriages allow for marks to be made on the wall so that object hanging fasteners can be attached to the wall.

21 Claims, 7 Drawing Sheets

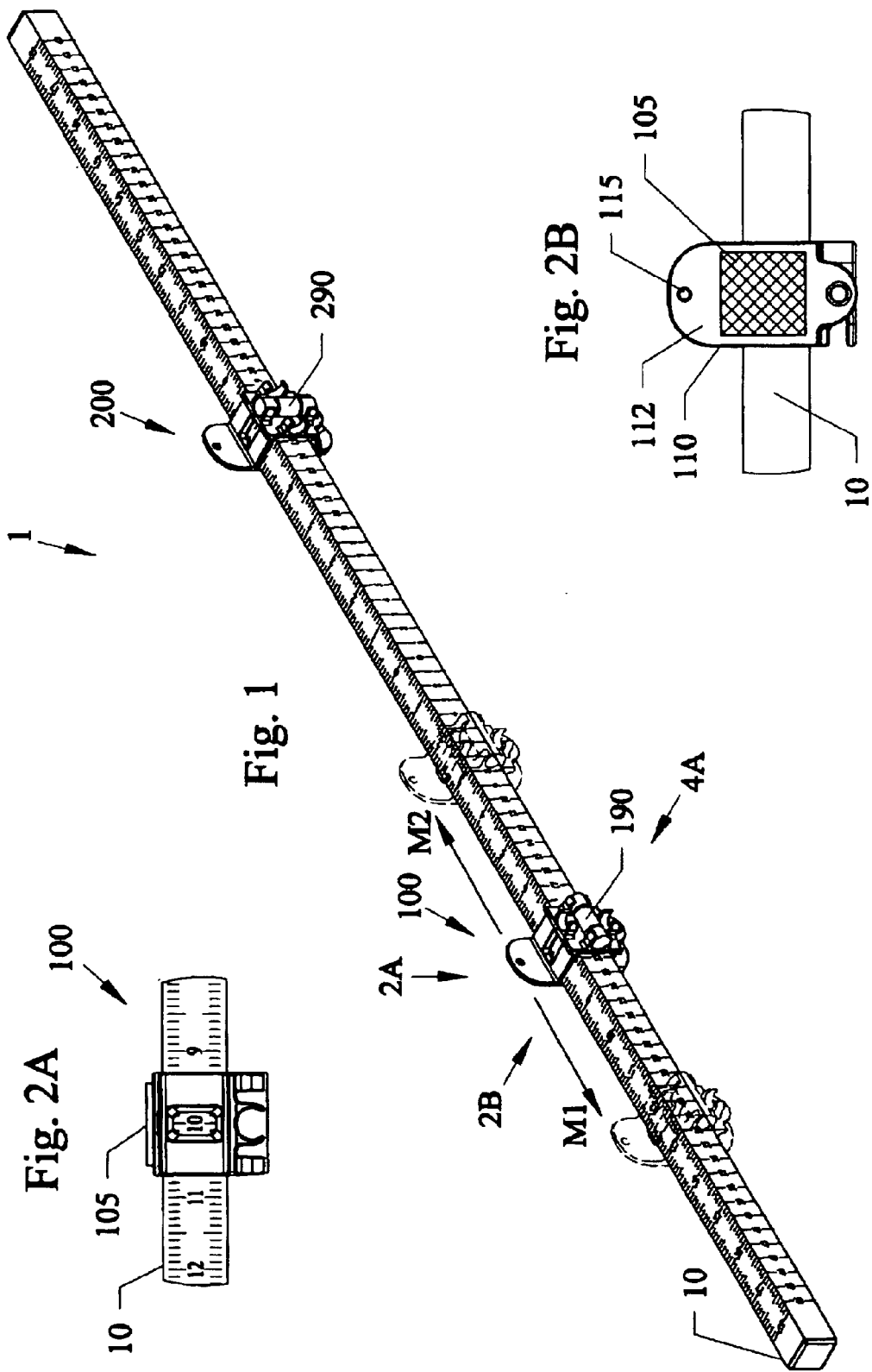

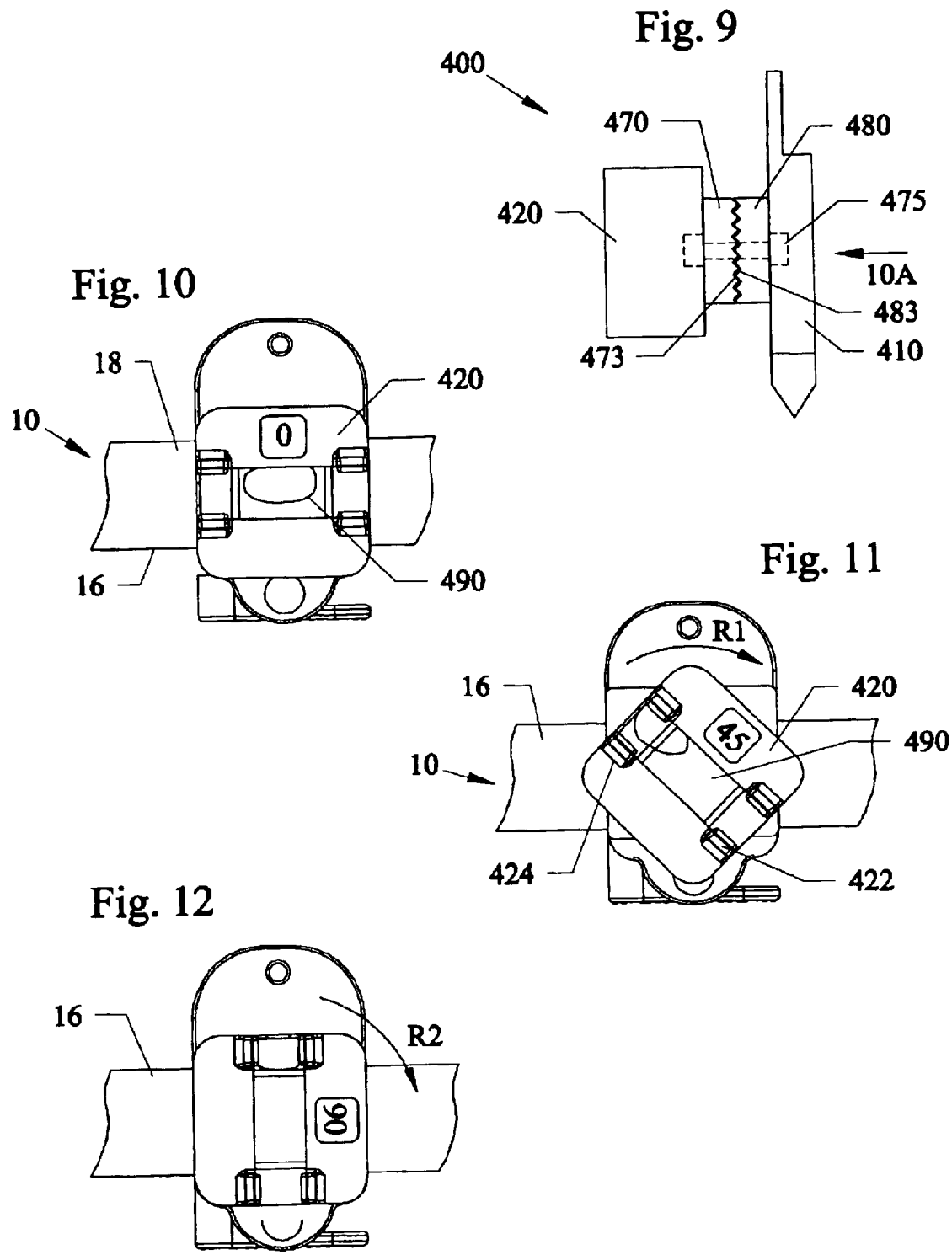

MEASURING AND LEVELING DEVICE

This invention relates to measuring and leveling tools, and in particular to a novel tool device that allows a single user to be able to combine the use of a tape measure and leveler in one device to correctly and accurately align objects such as picture frames, mirrors and paintings in order for being mounted on walls, and claims the benefit of priority to U.S. Provisional Patent Application No. 60/324,707 filed Sep. 25, 2001.

BACKGROUND AND PRIOR ART

It is often tedious and frustrating to be able to accurately hang wall mounted objects such as a picture frame. Currently, hanging objects such as a picture frame in a stable fixed manner has often required the use of two nails that must be inserted at identical heights into a wall and be correctly spaced apart from one another in order to receive hooks and/or wires from the back of the picture frame. Measuring the precise locations where the nails are to be inserted often requires careful and time consuming measurements and/or the necessity of having a second person to stand behind the installer to make sure the mounting is correctly done. Frustration can be a common result where errors cause the installer to start the process over a second and even a third time. Often the installer goes through a trial and error approach where extra holes are punched into the wall that can be unsightly and often need to be separately repaired.

Over the years many devices have been proposed. See for example, U.S. Pat. No. 2,816,366 to Barlow; U.S. Pat. No. 3,752,566 to Mathews; U.S. Pat. No. 4,241,510 to Radecki; U.S. Pat. No. 4,429,466 to Leonard; U.S. Pat. No. 4,648,185 to Brandimarte; U.S. Pat. No. 5,092,057 to Hoenig, Sr.; U.S. Pat. No. 5,103,573 to Ehling et al., and U.S. Pat. No. 6,029,362 to Miodragovic. Also see for example, United Kingdon Patent Specification No. 1,445,271 to Bryen, and Johnson Level & Tool Web pages for product entitled: Mark-It.

While attempts have been made to try to be able to make a picture leveling device, none of these proposed devices singularly or in combination allow for hanging various sized objects in an easy and efficient manner. For example, all of the proposed devices appear to be limited to only being able to show calibration with a single unit such as showing inches which fails to take into the necessity of being able to measure in other units such as the metric system and the like. Most of these devices limit any leveling to be in one or at most two fixed planes, where the bubble type levels must be perpendicular to one another, which would eliminate any versatility required for planes having different degree requirements. Most of these proposed devices are variations on common thin planar shaped rulers that must be held against a wall, which would be extremely difficult and uncomfortable to the installer since the thin edges of the ruler would be difficult to handle in addition to having the installer hold the thin ruler devices with their arms being raised and/or extended outward. Some of the proposed devices such as Radecki '510, Leonard '466 and Hoenig, Sr. '057 require T type shapes and additional mounting paraphernalia that would add to the difficulty of mounting objects, and these devices because of the their unusual shapes would be difficult to be stored when not being used. In addition many of these devices can be heavy to use and difficult to handle and would have limited versatility for being able to hang many types of wall mountable objects.

SUMMARY OF THE INVENTION

A primary objective of the invention is to provide a measuring and leveling tool for allowing objects such as picture frames, mirrors and paintings to be correctly and properly aligned for mounting on a wall that can be easily and quickly be done by a single installer.

A secondary objective of the invention is to provide a measuring and leveling tool for allowing objects such as picture frames, mirrors and paintings to be correctly and properly aligned for mounting on a wall that eliminates prior trial and error techniques and eliminates extra damage to the walls by not making any unnecessary hole punches into the wall.

A third objective of the invention is to provide a measuring and leveling tool for allowing objects such as picture frames, mirrors and paintings to be correctly and properly aligned for mounting on a wall that can be done in substantially less time than well known prior techniques.

A fourth objective of the invention is to a measuring and leveling tool for allowing objects such as picture frames, mirrors and paintings to be correctly and properly aligned for mounting on a wall that uses a device that is lighter, easier to use and handle and is more versatile than prior proposed devices.

A fifth objective of the invention is to a measuring and leveling tool for allowing objects such as picture frames, mirrors and paintings to be correctly and properly aligned for mounting on a wall that uses a non planar elongated device that is easy to grip and handle by an installer.

A sixth objective of the invention is to a measuring and leveling tool for allowing objects such as picture frames, mirrors and paintings to be correctly and properly aligned for mounting on a wall that can use different degree unit representations such as both inches and the metric system on a single device for greater versatility.

A seventh objective of the invention is to a measuring and leveling tool for allowing objects such as picture frames, mirrors and paintings to be correctly and properly aligned for mounting on a wall that can use allow for leveling along plural planes from horizontal levelers to vertical levelers and can be adjustable to any degrees therebetween.

Embodiments include carriage type assemblies that can fit over elongated measuring bodies, where each carriage can have front walls with clips that allow leveling gauges such as bubble gauges to be interchangeably mounted thereon in different positions as needed. The carriage assemblies can include depressible switches that can easily lock the carriage assemblies in place. End caps on the measuring body further prevent the carriage assemblies from sliding off, and can be removed for allowing hollow interior portions of the measuring body to be used for storage. The measuring bodies can have indicia across, one or more exterior faces, and can include different measuring units such as but not limited to metric, inches, and the like.

Another embodiment allows for the carriage assemblies to have rotatable outer faces so that leveling gauges mounted thereon can be rotated to selected positions.

Further objects and advantages of this invention will be apparent from the following detailed description of a presently preferred embodiment which is illustrated schematically in the accompanying drawings.

BRIEF DESCRIPTION OF THE FIGURES

FIG. 1 is a perspective view of a first preferred embodiment of the measuring and leveling device.

FIG. 2A is a top view of one of the slidable carriages of FIG. 1 along arrow 2A without a gauge.

FIG. 2B is a rear view of the slidable carriage of FIGS. 1 and 2A along arrow 2B.

FIG. 9 shows a side view of a second embodiment version of a rotatable leveling gauge for use with the measuring and leveling device of the preceding figures.

FIG. 10 is a front view of the rotatable gauge of FIG. 9 along arrow 10A in a horizontal position.

FIG. 11 is another view of the rotatable gauge of FIG. 10 rotated approximately 45 degrees.

FIG. 12 is another view of the rotatable gauge of FIG. 10 rotated 90 degrees.

DESCRIPTION OF THE PREFERRED EMBODIMENTS

Figure 3:
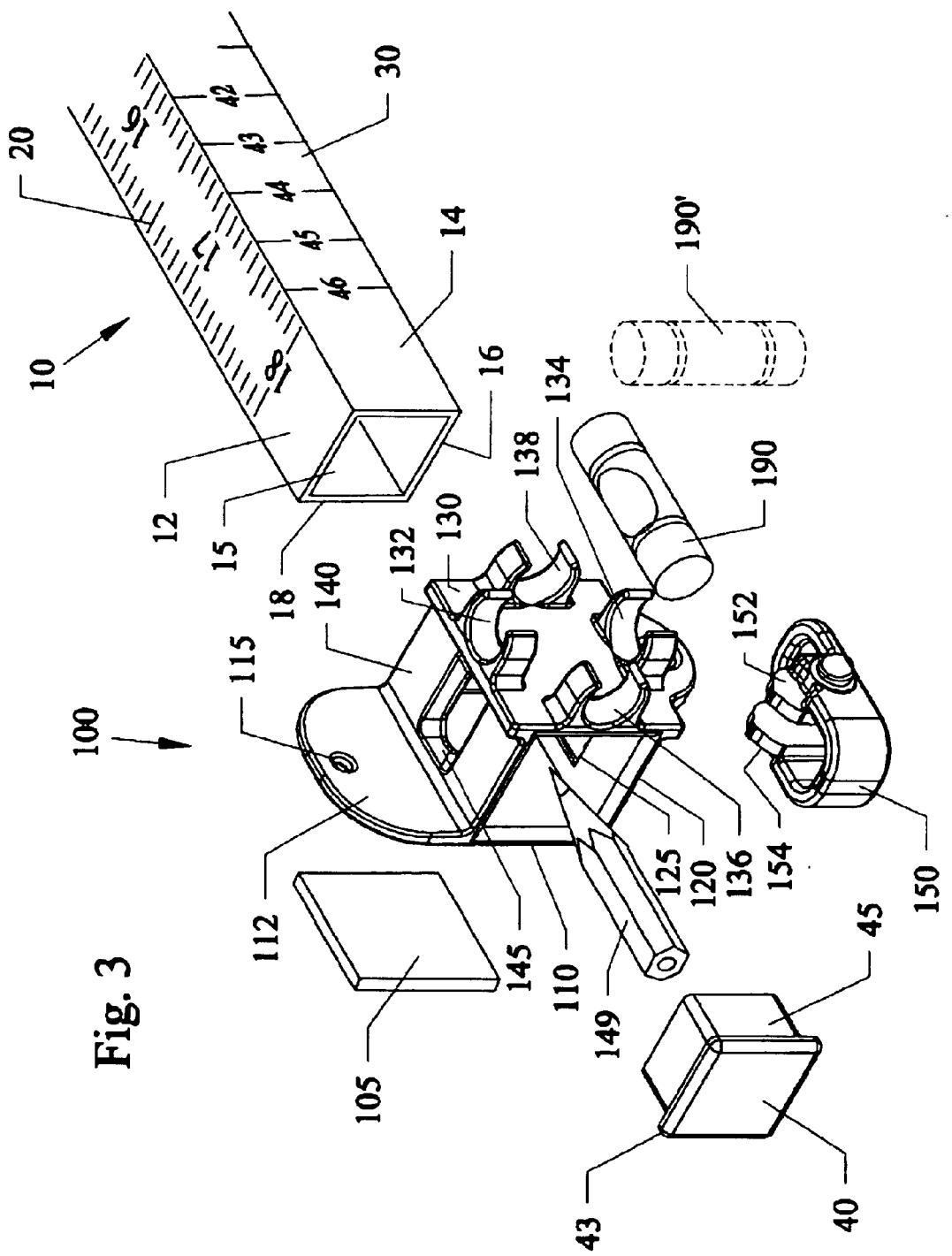
FIG. 3 is an exploded view of a carriage, elongated measuring body with detached end cap of FIGS. 1 and 2A–2B.

Before explaining the disclosed embodiments of the present invention in detail it is to be understood that the invention is not limited in its application to the details of the particular arrangement shown since the invention is capable of other embodiments. Also, the terminology used herein is for the purpose of description and not of limitation.

FIG. 1 is a perspective view of a first preferred embodiment 1 of the measuring and leveling device having an elongated measuring body 10 and two slidable carriages 100, 200 each with leveling gauges 190, 290, respectively, thereon. As shown the gauges 190, 290 can be positioned in different orientations on the carriages 100, 200.

FIG. 2A is a top view of one of the slidable carriages 100 of FIG. 1 along arrow 2A without a gauge 190. FIG. 2B is a rear view of the slidable carriage 100 of FIGS. 1 and 2A along arrow 2B. Referring to FIGS. 2A, 2B, the rear wall 110 of the carriage 100 can include a non-skid type pad 105 such as but not limited to a rubber, elastomer, and the like material, so that the entire device 1 can be positioned against a wall surface without sliding on the wall surface. Extending upward from the rear wall 110 can be a raised flange portion 112, having a through-hole 115 therethrough for allowing a marking instrument such as but not limited to a pencil, pen, and the like, that is used to mark a wall surface so that fasteners for hanging object can be located thereon.

FIG. 3 is an exploded view of a carriage, elongated measuring body with detached end cap of FIGS. 1 and 2A–2B. Referring to FIGS. 1–3, carriage 110 can include rear/back wall 110, bottom wall 120, front wall 130, top wall 140 that together form a rectangular box configuration with a hollow center therethrough that is sized to fit about the bottom 16, front 14, top 12 and rear walls 18 of the elongated measuring body 10. On the top wall 140 of carriage 100 can be a slit opening 145 which acts as a viewing window so that measuring indicia 20 can be visible therethrough when using the invention. The carriage 100 can also be mounted at a different orientation on the measuring body 10 so that different measuring indicia 30 can be visible through the window 145. As can be seen the elongated measuring body 10 can have different measuring units on its faces 12, 14, 16, 18 such as but not limited to metric units, inches, and the like. Inside the body 10 can be a hollow space 15, that can be used as a storage chamber for storing items 149, such as but not limited to writing implements 149(i.e. pencils, pens) therein. A cap end 40 has a plug portion 45 which fits into the end of hollow space 15, and has raised edges 43 that act as stops for preventing the carriage assembly 100 from falling off the measuring body 10. Across at least one outer wall face 130 of the carriage 100 can be mounting clips 132, 134, 136, 138 that can be used to mount leveling gauges 190 such as but not limited to bubble gauges thereon. On the bottom wall 120 of carriage 100 can be a locking switch-cam 150 that has a raised edge braking cam 152 that can pass through a slit 125 in the bottom wall 120 of carriage 100 and abut against the bottom 16 of measuring body 10, and will be explained in greater detail in reference to FIGS. 4A–4C and 5A–5C. Although not shown, the other carriage 200 can be identical to that of carriage 100 and include another cap end 40 on the opposite side of the measuring body 10.

Figure 4A:
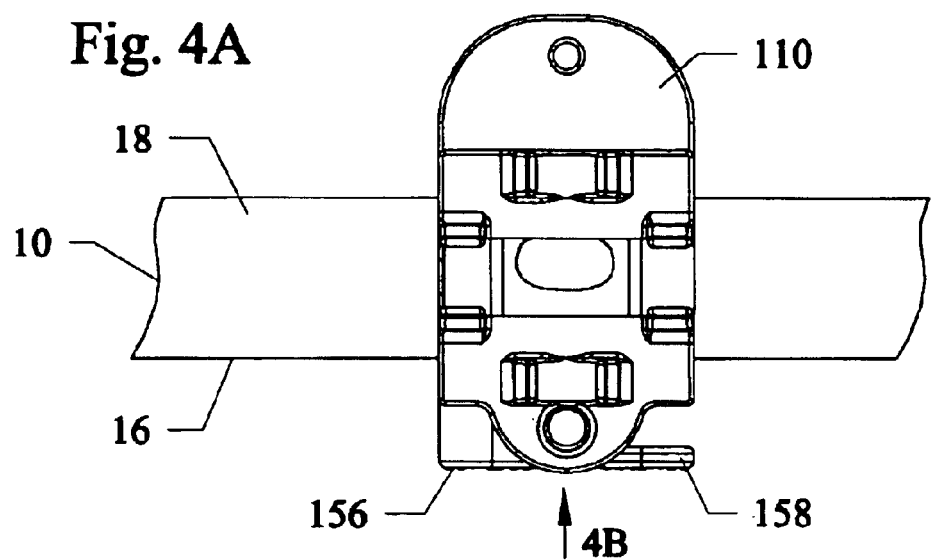
FIG. 4A is a front view of the slidable carriage of FIG. 2A along arrow 4A in a locked position.
Figure 4B:
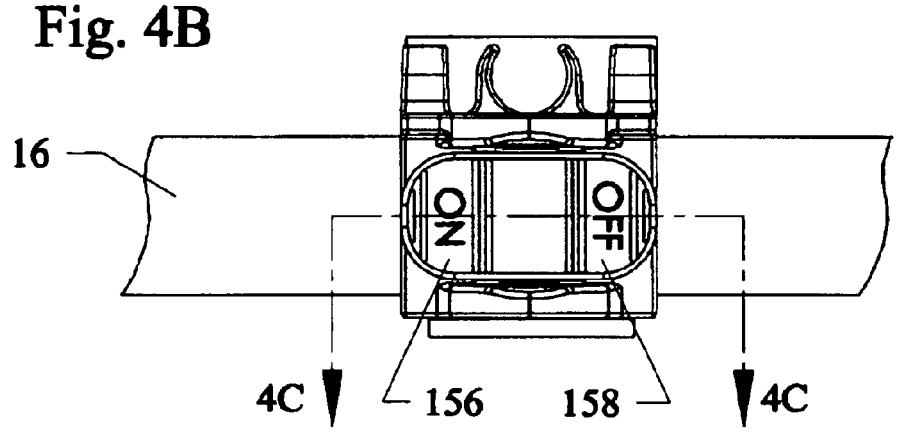
FIG. 4B is a bottom view of the locked slidable carriage of FIG. 4A along arrow 4B.
Figure 4C:
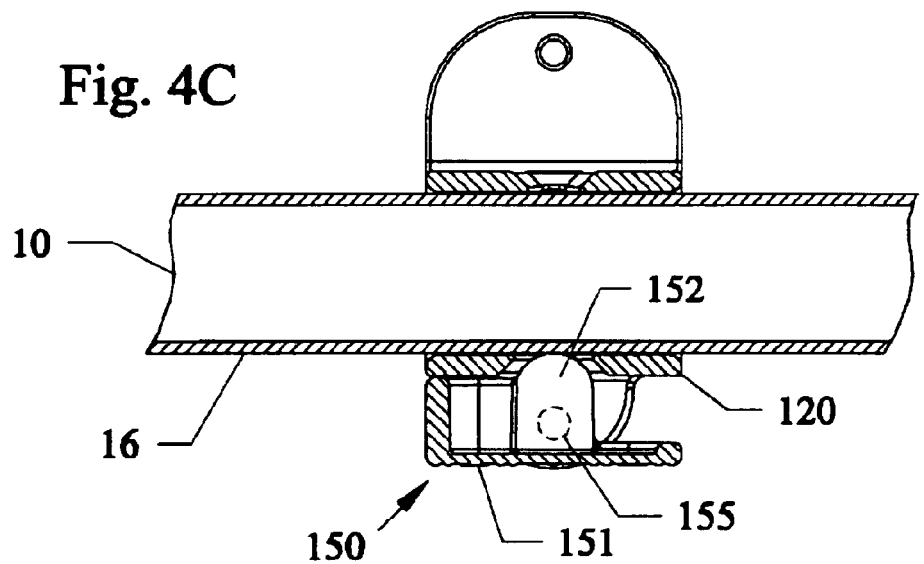
FIG. 4C is a cross-sectional view of the carriage and measuring body of FIG. 4B along arrows 4C.
Figure 5A:
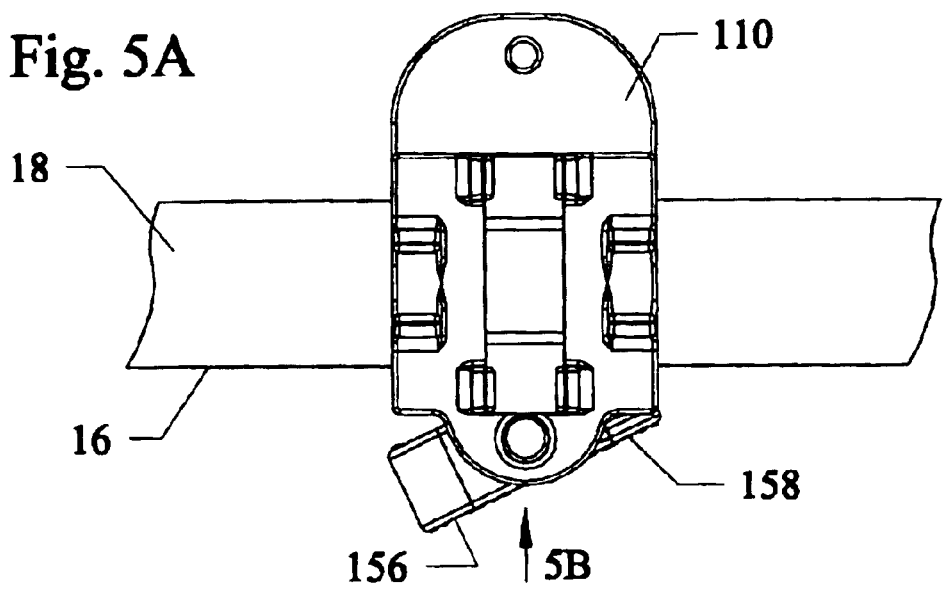
FIG. 5A is a front view of the slidable carriage of FIG. 2A along arrow 5A in a slidable position.
Figure 5B:
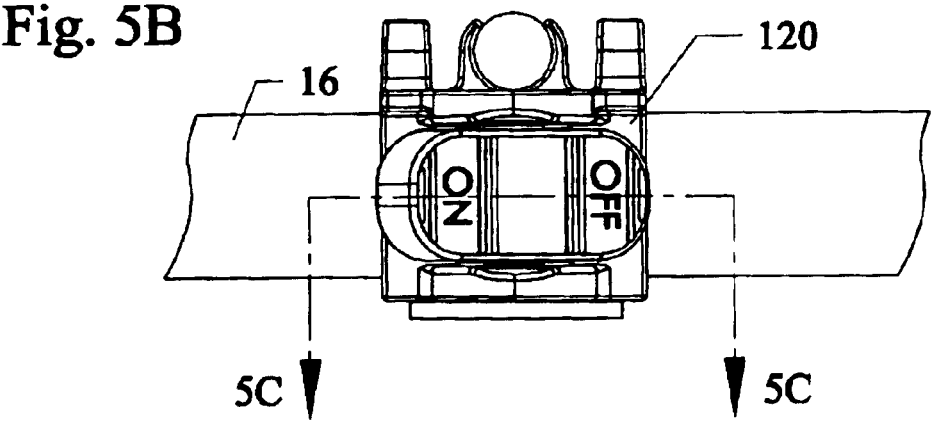
FIG. 5B is a bottom view of the freely slidable carriage of FIG. 5A along arrow 5B.
Figure 5C:
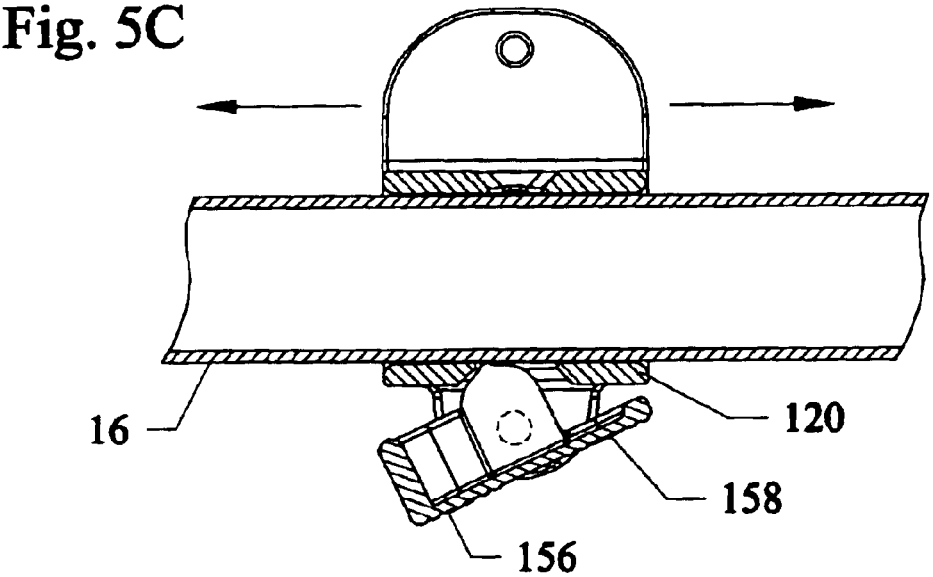
FIG. 5C is a cross-sectional view of the carriage and measuring body of FIG. 5B along arrows 5C.

FIG. 4A is a front view of the slidable carriage 100 of FIG. 2A along arrow 4A in a locked position. FIG. 4B is a bottom view of the locked slidable carriage 100 of FIG. 4A along arrow 4B. FIG. 4C is a cross-sectional view of the carriage and measuring body of FIG. 4B along arrows 4C. FIG. 5A is a front view of the slidable carriage 100 of FIG. 2A along arrow 5A in a slidable position. FIG. 5B is a bottom view of the freely slidable carriage 100 of FIG. 5A along arrow 5B. FIG. 5C is a cross-sectional view of the carriage and measuring body of FIG. 5B along arrows 5C.

Referring to FIGS. 4A–4C and 5A–5C, the switch-cam 150 can include a pair of raised edge braking cams 152, 154 that are pivotally mounted to the cam switch body 151 by a locking button pivot pin 155. The bottom of the switch cam 150 can have two depressible leave portions 156, 158 that each can be pressed to move the braking cams 152, 154 from an on position where the upper edges of the braking cams 152, 154 abut against the lower wall surface 16 of the measuring body so that the carriage 100 can be locked into a selected position on the measuring body 10, and an off position where the braking cams are rotated away from the lower surface 16 so that the carriage 100 can be freely slidable (in the directions of M1 and M2 FIG. 1) across the measuring body 10.

Figure 6:
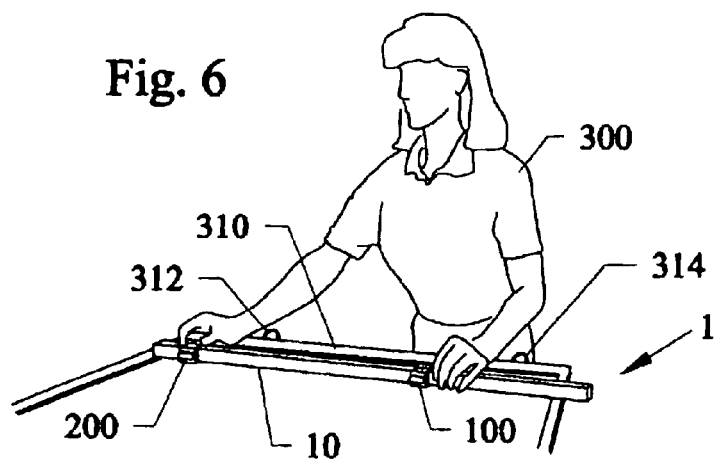
FIG. 6 shows an installer aligning the slidable carriages on the measuring and leveling device previously shown in FIG. 1 along the back of an object that is to be mounted to a wall.

FIG. 6 shows an installer 300 aligning the slidable carriages 100, 200 on the measuring and leveling device 1 previously shown in FIGS. 1–5C along the back of an object 310 that is to be mounted to a wall 350. The carriages 100, 200 can be slidably lined up to correspond to where existing mounting brackets 312, 314 are located on the object 310, and then locked in place on the measuring body 10.

Figure 7:
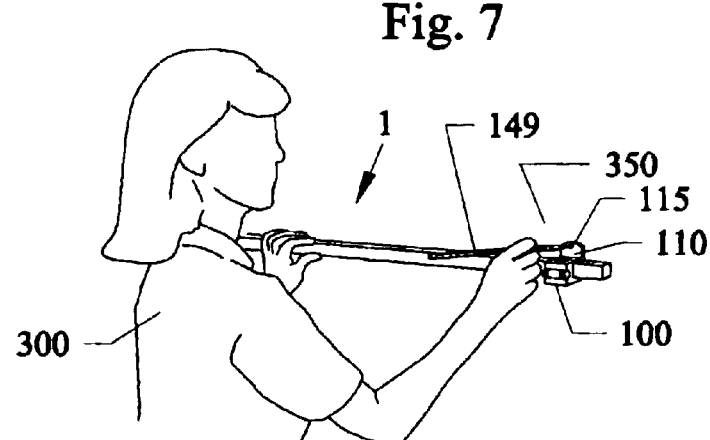
FIG. 7 shows the installer using the measuring and leveling device of FIG. 6 to align and mark the wall for locating the fasteners that are to be used for hanging the object thereon.
Figure 8:
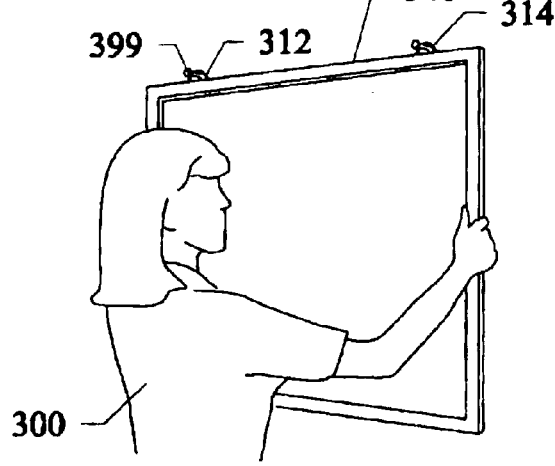
FIG. 8 shows the installer finally hanging the object in a properly aligned position on the wall.

FIG. 7 shows the installer 300 using the measuring and leveling device 1 of FIG. 6 to align and mark the wall 350 with a marking implement 149 that marks through a through-hole 115 in the back wall 110 of the locked carriage 100 for locating the fasteners 399(shown in the next figure) that are to be used for hanging the object thereon. FIG. 8 shows the installer 300 finally hanging the object 310 in a properly aligned position on the wall using fasteners 399 such as but not limited to nails, screws and the like.

FIG. 9 shows a side view of a second embodiment version 400 of a rotatable leveling gauge for use with the measuring and leveling device 1 of the preceding figures. FIG. 10 is a front view of the rotatable gauge of FIG. 9 along arrow 10A in a horizontal position. FIG. 11 is another view of the rotatable gauge 420 of FIG. 10 rotated approximately 45 degrees. FIG. 12 is another view of the rotatable gauge 420 of FIG. 10 rotated 90 degrees. Referring to FIGS. 9–11, the second embodiment 400 can include similar features and structure as that of the previous embodiment with the addition of having the front wall face 420 of the carriage 400 being rotatable so that a single leveling gauge 490 can be used that can be rotated to selected orientations across the carriage 400. The front wall 420 can be connected to another wall 410 by a ratchet type washers 470, 480 each being fixably mounted to respective walls 410,420 and each having rough irregular edges that face one another, with a pin member 475 connecting the walls 410, 420 together. The irregular facing edges 473, 483 allow for a ratcheting action that can allow the front face wall 420 to rotate in the direction of arrows R1 and R2 so that a leveling gauge 490 can rotate to any selected degree from zero to 360 degrees when being used.

Figure 13:
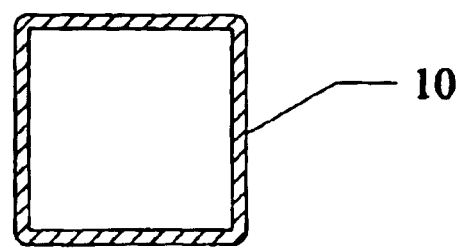
FIG. 13 is a cross-sectional view of an elongated measuring body having a rectangular shape.

FIG. 13 is a cross-sectional view of an elongated measuring body 10 having a rectangular shape which is what is primarily shown in the preceding figures.

Figure 14:
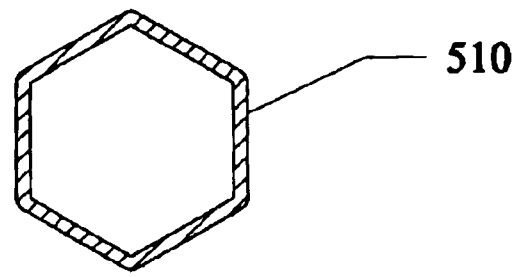
FIG. 14 is a cross-sectional view of an elongated measuring body having a hexagon shaped.

FIG. 14 is a cross-sectional view of an elongated measuring body 510 having a hexagon shape. As previously discussed the carriages 100, 200 can be sized with corresponding interior openings for allowing the carriages to slide across the measuring body.

Figure 15:
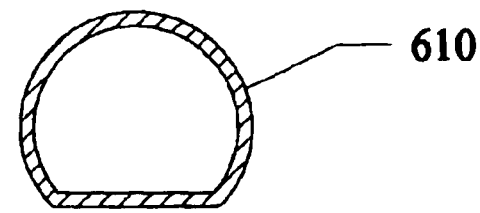
FIG. 15 is a cross-sectional view of an elongated measuring body having a circular shape with flattened rear wall surface.

FIG. 15 is a cross-sectional view of an elongated measuring body 610 having a circular shape with flattened rear wall surface. As previously discussed the carriages 100, 200 can be sized with corresponding interior openings for allowing the carriages to slide across the measuring body.

Figure 16:
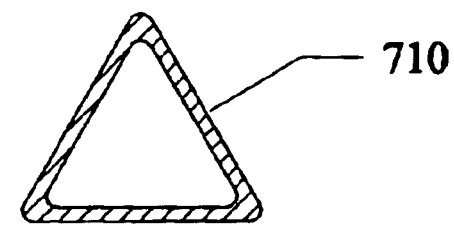
FIG. 16 is a cross-sectional view of an elongated measuring body having a triangular shape.

FIG. 16 is a cross-sectional view of an elongated measuring body 710 having a triangular shape. As previously discussed the carriages 100, 200 can be sized with corresponding interior openings for allowing the carriages to slide across the measuring body.

Although the preferred embodiments describe using the novel device to properly locate hanging fasteners such as those used for hanging picture frames, mirrors, and paintings, the invention can be used for other purposes. For example, the invention device can be used to properly locate brackets that are used for hanging drapes, shades, and the like. Additionally, the invention can be used for locating and properly aligning the height of any other wall mounted object such as but not limited to wall lights, outlet covers, phone jack covers, vent covers, wall switch covers, shelves, and any other wall mounted items.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A measuring and aligning tool for a wall surface, comprising in combination:

a single elongated body having a non planar shaped configuration, the elongated body having a flat rear wall spaced apart from a raised front wall enclosing a continuous uniform sized hollow space therebetween, the flat rear wall and the outer raised wall and the hollow space having a uniform cross-sectional shape inside the single elongated body;

calibration indicia along at least one side of the elongated body;

first slider for sliding along and around the elongated body, and having a flat rear wall which slides against the flat rear wall of the elongated body, the flat rear wall of the first slider adapted to be abutted against the wall surface, the flat rear wall of the first slider having a raised flat flange portion which extends upward and has an opening for allowing a mark to be formed therethrough on the wall surface;

first indication means for indicating a level condition on the first slider;

second slider for sliding along and around the elongated body, and having a flat rear wall which slides against the flat rear wall of the elongated body, the flat rear wall of the second slider adapted to be abutted against the wall surface, the flat rear wall of the first slider having a raised flat flange portion which extends upward and has an opening for allowing another mark to be formed therethrough on the wall surface; wherein each of the first and the second sliders has a switch-lock cam having two depressible leave portions on opposite sides of a mid-portion for pivoting between and on opposition where each of the sliders is locked in place on the elongated body, and an off position where each of the sliders is freely slidable along the elongated body and second indication means for indicating a level condition on the second slider, wherein positioning the first slider and the second slider spaced apart from on another aids in aligning an object to be mounted on a wall.

2. The tool of claim 1, wherein the elongated body includes: a cross-section having a polygon shape with the hollow space inside the polygon shape continuous along the elongated body.

3. The tool of claim 1, wherein the elongated configuration includes: a cross-section having a rectangular shape with the hollow space inside the rectangular shape continuous along the elongated body.

4. The tool of claim 3, further comprising:

measuring indicia along a top flat wall portion of the elongated body; and a top flat wall of each of the first and the second sliders having an opening for reading a portion of the measuring indicia therethrough; and at least one pair of snap clips on a front flat wall of the first and the second sliders, the front flat wall being perpendicular to the top flat wall of the first and the second sliders; and dual spaced apart prongs on each snap clip for snapably mounting sides of the first and the second indication means into each of the snap clips.

5. The tool of claim 1, wherein the elongated configuration includes: a cross-section having a triangular shape with the hollow space inside the triangular shape continuous along the elongated body.

6. The tool of claim 1, wherein the elongated configuration includes: a cross-section having a square shape with the hollow space inside the square shape continuous along the elongated body.

7. The tool of claim 1, wherein the elongated configuration includes: a cross-section having a substantially cylindrical shape with a flat rear side portion with the hollow space inside the cylindrical shape with the flat rear side portion continuous along the elongated body.

8. The tool of claim 1, wherein the first indication means and the second indication means each includes: a readable leveling bubble gauge.

9. The tool of claim 8, wherein the first slider and the second slider each includes:

a first pair of horizontal snap clips, each horizontal snap clip having dual spaced apart prongs; and a second pair of vertical snap clips, each vertical snap clip having dual spaced apart prongs, the vertical snap clips being perpendicular to and in a cross configuration to the horizontal snap clips, wherein the first pair and the second pair of snap clips are for interchangeably snapably mounting sides of the gage along two different orientations that are perpendicular to one another.

10. The tool of claim 8, wherein the first slider and the second slider each includes:

a first pair of snap clips each snap clip having dual spaced apart prongs on a face plate for snapably mounting sides of the gage thereon; and rotatable means for rotating the face plate with the mounted gage to selected orientation degrees on each of the first and the second sliders.

11. The tool of claim 1, further comprising:

stop means adjacent to opposite ends of the elongated body for restricting each of the first and second sliders from sliding off the opposite ends of the elongated body.

12. The tool of claim 11, wherein the stop means includes: end caps, wherein the continuous uniform sized hollow space within the elongated body being accessible by at least one of the end caps for storing a marking implement therein.

13. A method of measuring and leveling objects to be mounted on wall surfaces, comprising the steps of:

(a) positioning a single sized elongated hollow body having a flat rear surface and a raised front wall along a wall surface with a hollow space between the flat rear surface and the raised front wall having a uniform cross-sectional shape inside the single elongated body;

(b) sliding first and second sliders each having a flat rear wall with raised flat flange portion having an opening, and a raised front wall with a leveling gauge thereon, along and around the elongated body to selected spaced apart positions, the flat rear wall of the first and the second sliders abutting against the wall surface and separating the elongated body from the wall surface;

(c) locking the first and the second slider at the selected spaced apart positions so that each of the slider means does not move relative to the elongated body, the locking step further includes the steps of:

providing a switch cam having two depressible leaves on opposite sides of a middle pivot portion;

depressing one of the depressible leaves to lock the first and the second sliders onto a selected position along the elongated body; and depressing an opposite one of the depressible leaves to unlock the first and the second sliders to slide the sliders alone the elongated body;

(d) adjusting the elongated body to a substantially horizontal position by viewing the leveling gauge one each of the sliders; and (e) marking fastener mounting positions on the wall surface by marking through the opening in the raised flat flange portion on the first and the second sliders; and (f) removing the elongated body from the wall surface so that an object can then be mounted to the wall surface by inserting fasteners at the fastener mounting positions.

14. The method of claim 13, further comprising the step of:

providing a first pair of horizontal snap clips on a portion of the raised front wall of the first and the second sliders, each horizontal snap clip having dual spaced apart prongs; and providing a second pair of vertical snap clips on the portion of the raised front wall of the first and the second sliders, each vertical snap clip having dual spaced apart prongs, the first pair of the vertical snap clips being perpendicular to and in a cross configuration to the second pair of the horizontal snap clips;

interchanging and locking sides of the leveling gauges into the first pair of the horizontal snap clips or on the second pair of the vertical snap clips to determine horizontal or vertical leveling for the object to be leveled.

15. The method of claim 13, further comprising the step of:

providing a pair of snap clips on a face plate mounted to a portion of the raised front wall of the first and the second sliders, each snap clip having dual spaced apart prongs;

snapably mounting sides of the leveling gauges into each of the snap clips;

rotating the face plate with the mounted leveling gauges to a selected orientation degree on the first slider and the second slider.

16. The method of claim 13, wherein the sliding step includes the step of:

providing the first and the second sliders with a polygon cross-sectional perimeter shape; and sliding the first and the second sliders along and completely around the elongated body with the polygon cross-sectional shape.

17. The method of claim 13, wherein the sliding step includes the step of:

providing the first and the second sliders with a rectangular cross-sectional perimeter shape; and sliding the first and the second sliders along and completely around the elongated body with the rectangular cross-sectional shape.

18. The method of claim 17, further comprising the steps of:

providing measuring indicia along a top flat wall portion of the elongated body; and providing an opening in a top flat wall of each of the first and the second sliders for reading a portion of the measuring indicia therethrough; and providing at least one pair of snap clips on a front flat wall of the first and the second sliders, each snap clip having dual spaced apart prongs, the front flat wall being perpendicular to the top flat wall of the first and the second sliders; and snapably mounting sides of the leveling gauges into each of the snap clips.

19. The method of claim 13, wherein the sliding step includes the step of:

providing the first and the second sliders with a triangular cross-sectional perimeter shape; and sliding the first and the second sliders along and completely around the elongated body with the triangular cross-sectional shape.

20. The method of claim 13, wherein the sliding step includes the step of:

providing the first and the second sliders with a cylindrical cross-sectional perimeter shape having a flat rear side portion; and sliding the first and the second sliders along and completely around the elongated body with the cylindrical cross-sectional shape with the flat rear side portion.

21. The method of claim 13, wherein the sliding step includes the step of:

providing the first and the second sliders with a square cross-sectional perimeter shape; and sliding the first and the second sliders along and completely around the elongated body with the square cross-sectional shape.

* * * * *